(12) United States Patent
Miyakawa et al.

(10) Patent No.: US 7,402,108 B2
(45) Date of Patent: Jul. 22, 2008

(54) FLEXIBLE SHAFT COUPLING

(75) Inventors: Tetsuya Miyakawa, Noogata (JP);
Hitoshi Terado, Noogata (JP); Kazuichi Fukuda, Fujisawa (JP)

(73) Assignees: Kyushu Hasec Co., Ltd., Fukuoka (JP);
Shoyo Engineering Co., Ltd., Tokyo (JP)

( * ) Notice: Subject to any disclaimer, the term of this patent is extended or adjusted under 35 U.S.C. 154(b) by 319 days.

(21) Appl. No.: 11/085,061

(22) Filed: Mar. 22, 2005

(65) Prior Publication Data

US 2005/0221899 A1    Oct. 6, 2005

(30) Foreign Application Priority Data

Mar. 31, 2004   (JP)   ............................. 2004-103068

(51) Int. Cl.
*F16D 3/66*   (2006.01)

(52) U.S. Cl. ..................... 464/65.1; 267/169

(58) Field of Classification Search ............... 464/65.1, 464/51, 62.1, 61.1, 68.9, 68.92; 267/166, 267/169
See application file for complete search history.

(56) References Cited

U.S. PATENT DOCUMENTS

| | | | |
|---|---|---|---|
| 1,157,553 A * | 10/1915 | Kleinow | 464/65.1 |
| 1,264,742 A * | 4/1918 | Aldrich | 464/65.1 |
| 1,491,761 A * | 4/1924 | Smith | 464/65.1 |
| 1,642,907 A * | 9/1927 | August | 464/65.1 |
| 1,783,158 A * | 11/1930 | Eckart | 464/65.1 |
| 2,899,809 A | 8/1959 | Battaline | |
| 3,503,601 A * | 3/1970 | Wells | 267/169 |
| 4,639,237 A | 1/1987 | Fukuda | |
| 5,795,231 A | 8/1998 | Fukuda | |
| 6,699,131 B2 * | 3/2004 | Jackel et al. | 464/68.9 |

FOREIGN PATENT DOCUMENTS

| | | | |
|---|---|---|---|
| EP | 0 053 502 A1 | | 6/1982 |
| EP | 607857 | * | 7/1994 |
| GB | 1 523 399 | | 8/1978 |
| JP | 59-212528 | | 12/1984 |
| JP | 6-213247 | | 8/1994 |
| JP | 2001-349338 | | 12/2001 |

* cited by examiner

*Primary Examiner*—Greg Binda
(74) *Attorney, Agent, or Firm*—Wenderoth, Lind & Ponack, L.L.P.

(57) ABSTRACT

A flexible shaft coupling has first and second hubs, each of which is provided with flanges and connected to a transmission shaft. The flange of the first hub has spring holes extended therethrough. A cover is fixed to the second hub so that the flange of the first hub is held between the cover and the flange of the second hub, and the cylindrical part of the first hub extends through the cover. A plurality of coil spring sets each comprises multiple barrel-shaped coil springs. Each of the coil springs is supported in the spring hole so that the adjoining end faces thereof are in contact and in series with each other.

17 Claims, 4 Drawing Sheets

FLEXIBLE SHAFT COUPLING

BACKGROUND

This invention relates to a flexible coupling that effectively accommodates shaft misalignments, absorbs shock and damps vibration using coil springs as the flexible member in the torque transmitting mechanism.

One type of flexible shaft coupling uses coil springs as its flexible member. In one variation of this type, the coil springs are disposed to change their shape in a direction perpendicular to the axis thereof. This type of flexible shaft coupling comprises a first and a second hub each having a flange at one end thereof and adapted for connection of the transmission shaft, a cover fastened to the flange of the second hub in such a manner as to allow passing therethrough of a cylindrical part of the first hub and accommodate the flange of the first hub, and coil springs passing through each of multiple spring holes provided along the periphery of the flange of the first hub. The first and second hubs are disposed so that the flanges thereof face each other with a clearance gap and the coil springs are compressed between the flange of the second hub and the cover. Torque is transmitted between the first and second hubs via the coil springs. Japanese Provisional Patent Publication S59-212528 (U.S. Pat. No. 4,639,237) discloses this type of flexible shaft coupling.

Requiring no spring seat, flexible shaft couplings of this type have advantages such as a simple and small structure and a small moment of inertia. However, the coil springs, which resist the load at each center portion of their springs perpendicularly to each spring axis, therefore receive great stress and are not allowed to deflect greatly. When the coupling is installed in some equipment, the permissible allowance of shaft misalignments, driving torque, absorbing shocks and reducing vibration is comparatively smaller than required.

To eliminate the smaller allowance of shaft misalignments, driving torque and reducing vibration, the inventor invented the flexible shaft coupling described below. The coil springs are barrel-shaped coil springs whose largest outside diameter portion is closely fit in the spring hole in the first hub and the smallest inside diameter portion is closely fit over the spring supporting pin held between the flange of the second hub and the cover. The barrel-shaped springs are interposed, in a compressed state, between the flange of the second hub and the cover so that, when torque is transmitted, the barrel-shaped coil springs deform and come into contact with adjoining coils thereof. Japanese Provisional Patent Publication H6-213247 (U.S. Pat. No. 5,795,231) discloses this type of flexible shaft coupling.

The barrel-shaped coil springs in the flexible shaft coupling described above increases in outside diameter as transmitted torque increases. This, in turn, results in increased coupling outside diameter and increased moment of inertia.

SUMMARY OF THE INVENTION

The object of this invention is to provide a type of flexible shaft coupling using barrel-shaped coil springs that permit inhibiting the upsizing of the flexible shaft coupling and increasing the amount of torque transmitted without impairing the functions of shaft alignment, shock absorbing and vibration damping.

A flexible shaft coupling of a first invention comprises a first hub connected to a transmission shaft, a second hub connected to a transmission shaft, a cover fixed to the flange of the second hub, spring supporting pins, and a plurality of coil spring sets each comprising multiple barrel-shaped coil springs. The first hub has a cylindrical part, an outwardly extending flange a tone end of the cylindrical part and a plurality of spring holes extending through the flange circumferentially spaced along the periphery thereof. The second hub has a cylindrical part and an outwardly extending flange at one end of the cylindrical part. The flange of the first hub is accommodated in the cover and the flange of the second hub, and the cylindrical part of the first hub extends through the cover. The flange of the first hub and each of the flange of the second hub and the cover have a space therebetween sufficient to accommodate shaft misalignments. The spring supporting pins are supported between the flange of the second hub and the cover.

The barrel-shaped coil springs of each coil spring set are passed through the spring hole in the flange of the first hub and supported in the spring hole by the spring supporting pin so that the adjoining end faces thereof are in contact and in series with each other. The largest outside diameter portion of the barrel-shaped coil spring is loose-fitted in the spring hole in the first hub and the smallest inside diameter portion is interference-fitted over the spring supporting pin. The barrel-shaped coil springs are compressed between the cover and the flange of the second hub so that, when torque is transmitted between the first and second hubs via the barrel-shaped coil springs, the barrel-shaped coil springs deform and adjoining coils of the coil spring come into contact with each other, with the resulting friction causing the coil spring to absorb shocks and reduce torsional vibration.

As the flexible shaft coupling of the first invention has multiple barrel-shaped coil springs in one spring hole, the load during torque transmission is applied on multiple barrel-shaped coil springs. Accordingly, the flexible shaft coupling transmits as many times greater torque as the number of the barrel-shaped coil springs than a flexible shaft coupling having only one barrel-shaped coil spring of the same size. While the axial length of the flexible shaft couplings increases by the number of springs, the moment of inertia of the couplings increases only by between, for example, 30 and 60 percent if the spring diameter is the same. Therefore, the flexible shaft couplings can transmit greater torque without growing in size and impairing the functions of shaft alignment, shock absorbing and vibration damping.

In the flexible shaft coupling described above, the clearance for the loose-fit between the largest outside diameter portion of the coil spring and the spring hole can be 0.1% to 15% of the largest outside diameter of the coil spring, depending on the amounts of the shaft misalignments to be accommodated.

In the flexible shaft coupling described above, a barrel-shaped stopper can be passed through the spring hole and supported by the flange of the second hub and the cover. An annular stopper can be inserted between the adjoining barrel-shaped coil springs and supported by the supporting pin.

A flexible shaft coupling of a second invention comprises a first hub connected to a transmission shaft, a second hub connected to a transmission shaft, a cover, an annular center flange, spring supporting pins and a plurality of coil spring sets each comprising multiple barrel-shaped coil springs. The first hub has a cylindrical part, an outwardly extending flange at one end of the cylindrical part and a plurality of spring holes extending through the flange circumferentially spaced along the periphery thereof. The second hub has a cylindrical part and an outwardly extending flange at one end of the cylindrical part. The cover through which the cylindrical part of the first hub extends has an outwardly extending flange at one end thereof. The annular center flange is held between the flange of the cover and the flange of the second hub so that the flange of the first hub is accommodated in the cover and the center flange. The flange of the first hub, the cover and the annular center flange have a space therebetween sufficient to accommodate shaft misalignments. Spring supporting pins are supported between the cover and the annular center flange. The barrel-shaped coil springs are passed through the spring hole in the flange of the first hub. The barrel-shaped coil springs are the same in the structure and action as those of the flexible shaft coupling of the first invention.

The flexible shaft couplings of the second inventions is the same in the action as that of the flexible shaft coupling of the first invention. A barrel-shaped stopper and an annular stopper can be fitted on the coupling. The flexible shaft coupling of the second invention can be disassembled by removing the first hub, cover and center flange in one piece from the second hub. As this eliminates the need for pulling out the spring supporting pin, the flexible shaft coupling of the second invention is suited for use in areas where disassembly space is limited.

A flexible shaft coupling of a third invention comprises a first coupling unit and a second coupling unit. Each of the coupling units comprises a hub connected to a transmission shaft, a cover, an annular center flange, spring supporting pins and a plurality of coil spring sets each comprising multiple barrel-shaped coil springs. The hub has a cylindrical part, an outwardly extending flange at one end of the cylindrical part and a plurality of spring holes extending through the flange circumferentially spaced along the periphery thereof. The cover through which the cylindrical part of the hub extends has a flange at one end thereof. The annular center flange is in contact with the end face of said cover so that the flange of the hub is accommodated therein the cover and the annular center flange. A space between the flange of the hub and each of the annular center flange and the cover is sufficient to accommodate shaft misalignments. The spring supporting pins are supported between the cover and the annular center flange. The barrel-shaped coil springs are passed through the spring hole in the flange of the hub. The barrel-shaped coil springs are the same in the structure and action as those of the flexible shaft coupling of the first invention.

The flexible shaft coupling of the third invention is the same in the action as that of the flexible shaft coupling of the first invention. Because two coupling units are connected via the center flange, the flexible shaft coupling of the third invention adjusts twice as much offset misalignment, axial misalignment and angular misalignment of the transmission shaft as other types of flexible shaft couplings. As the torsional spring constant is ½, the flexible shaft coupling of the third invention has greater shock absorbing and vibration damping performance. A barrel-shaped stopper and an annular stopper can be fitted on the coupling.

DESCRIPTION OF THE PREFERRED EMBODIMENTS

Figure 1:
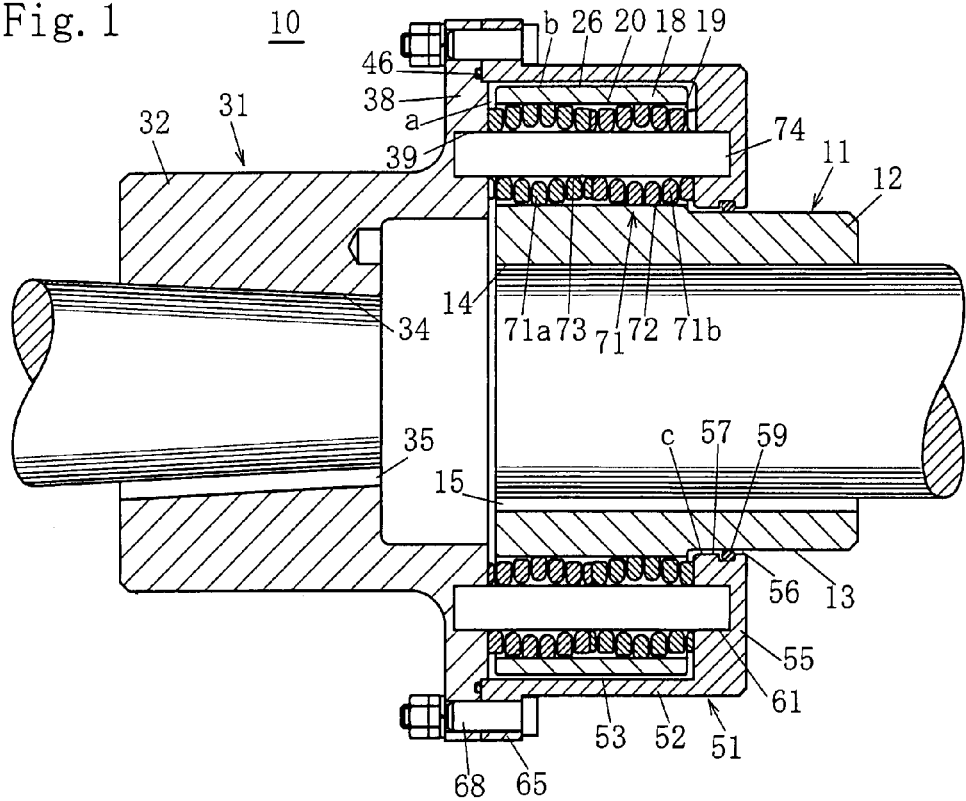
FIG. 1 is a longitudinal cross-sectional view of a flexible shaft coupling embodying the first invention.
Figure 2:
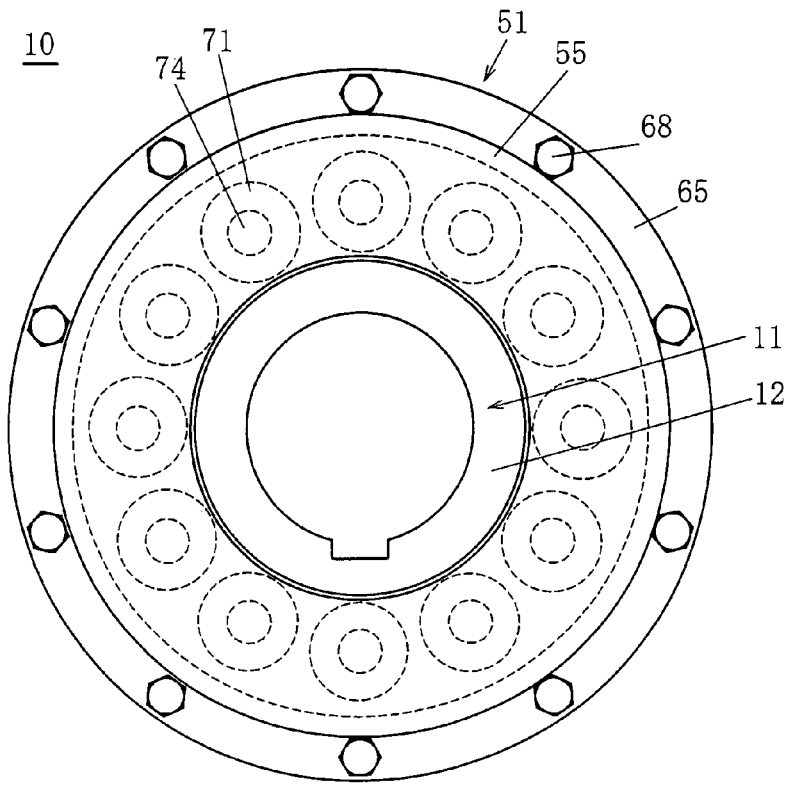
FIG. 2 is a front view of the flexible shaft coupling shown in FIG. 1.

FIGS. 1 and 2 show a preferred embodiment of the first invention. FIG. 1 is a longitudinal cross-sectional view of a flexible shaft coupling and FIG. 2 is a front view of the same coupling.

A flexible shaft coupling 10 comprises a first hub 11, a second hub 31, a cover 51 and a plurality of coil spring sets 71.

The first hub 11 has a flange 18 formed at one end of the cylindrical part 12 thereof, with twelve spring holes 19 provided along the circumference of the flange 18. The cylindrical part 12 has a keyway 15 cut therein to hold a key by means of which the transmission shaft 14 is connected to the first hub 11.

The second hub 31 has a flange 38 formed at one end of the cylindrical part 32 thereof that has a keyway 35 for connecting the transmission shaft 34. Spring supporting pin holes 39 corresponding to the spring holes 19 in the flange 18 on the first hub 11 are provided in the end face of the flange 38.

The cover 51 has an annular portion 55 formed at one end of a cylindrical cover body 52 thereof. The annular portion 55 has a hole 56 through which the cylindrical part 12 of the first hub 11 is passed. The cover 51 also has spring supporting pin holes 61 that face the spring supporting pin holes 39 in the flange 38 on the second hub 31.

The flange 38 of the second hub 31 and a flange 65 of the cover 51 are fixed together with connecting bolts 68. When the second hub 31 and cover 51 are fixed together, both ends of spring supporting pins 74 fit in the spring supporting pin holes 39 and 61 in the flange 38 on the second hub 31 and the cover 51. Both ends of the spring supporting pins 74 are thus supported by the second hub 31 and the cover 51. While the cylindrical part 12 of the first hub 11 passes through the hole 56 in the annular portion 55 of the cover 51, the flange 18 of the first hub 11 is held inside the cover 51 so as to face the flange 38 of the second hub 31. Space clearances a, b and c large enough for accommodation of shaft misalignments are left between the flange 18 of the first hub 11 and the flange 38 of the second hub 31, the outer periphery 26 of the flange 18 of the first hub 11 and an inner surface 53 of the cover body 52, and the outer periphery 13 of the cylindrical part 12 of the first hub 11 and the inner periphery 57 of the hole 56 in the annular portion 55 of the cover 51. O rings 46 and 59 are inserted to prevent the infiltration of water and dust from outside into the cover between the flange 38 of the second hub 31 and the flange 65 of the cover 51 and the outer periphery 13 of the cylindrical part 12 of the first hub 11 and the inner periphery 57 of the hole 56 in the annular portion 55 of the cover 51. Grease is applied for lubrication and rust prevention to an inner area defined by the first hub 11, the second hub 31 and the cover 51.

The shaft flexible coupling 10 has twelve coil spring sets. Each coil spring set 71 comprises a first barrel-shaped coil spring 71a and a second barrel-shaped coil spring 71b disposed in series with each other to constitute a set. The barrel-shaped coil springs are passed through the spring hole in the flange 18 on the first hub 11 so that the front end of the first barrel-shaped coil spring 71a is in contact with the rear end of the second barrel-shaped coil spring 71b. The largest outside diameter portion 72 of each barrel-shaped coil spring 71a, 71b is loose-fitted or clearance-fitted in the spring hole 19 in the first hub 11. The clearance for the loose-fit is preferable to be 0.1% to 15% of the largest diameter of the coil spring. The amount of shaft offset misalignment that is accommodated increases by an amount corresponding to the clearance between the barrel-shaped coil spring 71a, 71b and spring hole 19. The smallest inside diameter portion 73 thereof is interference-fitted over the spring supporting pin 74. The allowance for interference-fit, such as a tight-fit requiring light pressure for assembly or a shrink-fit used for permanent shrink on steel members, is negative.

The barrel-shaped coil springs 71a and 71b are interposed, in a compressed state, between the flange 38 of the second hub 31 and the annular portion 55 of the cover 51 so that, when torque is transmitted, the barrel-shaped coil springs 71a and 71b deform and adjoining coils of the coil spring come into contact with each other.

The flexible shaft coupling 10 described above transmits torque from the driving shaft to the first hub 11 to which the driving shaft is connected, to the barrel-shaped coil springs 71a and 71b loose-fitted in the spring hole 19 in the flange 18 on the first hub 11, to the spring supporting pins 74 holding the barrel-shaped coil springs interference-fitted thereover and supported by the flange 38 on the second hub 31 and the annular portion 55 of the cover 51, and to the second hub 31 to which the driven shaft is connected, or in the reverse direction. Then, a portion of the middle part of the barrel-shaped coil springs 71a and 71b between the largest diameter portion 72 and the smallest diameter portion 73 moves inward depending on the amount of torque transmitted. Therefore, the barrel-shaped coil springs elastically deform so that the opposite side thereof stretches outward.

Because the load in torque transmission is applied on two barrel-shaped coil springs 71a and 71b, the flexible shaft coupling 10 transmits twice as much torque as one with one barrel-shaped coil spring of the same size. While the flexible shaft coupling 10 is axially longer by the length of one spring, the diameter is the same. Therefore, the moment of inertia of the coupling increases only by, for example, 30 to 60 percent.

The barrel-shaped coil springs accommodate offset misalignment by deflection in the diametrical direction, axial misalignment by deflection in the axial direction, and angular misalignment by curved deflection in the longitudinal direction of the spring axis diagonal occurring in each transmission shaft.

The barrel-shaped coil springs absorb and reduce the shock and torsional vibration in the torque transmission system by the elastic deformation thereof and friction between adjoining coils. The barrel-shaped coil springs simultaneously transmit torque, accommodate shaft misalignments, absorb shocks and reduce torsional vibration while undergoing elastic deformation.

Figure 3:
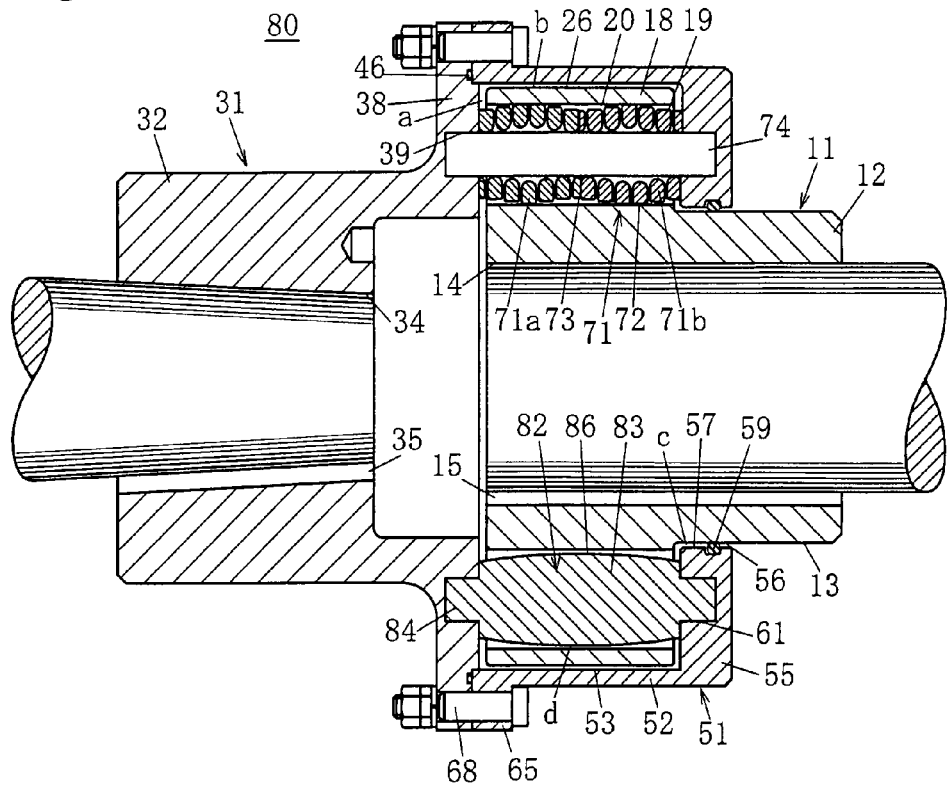
FIG. 3 is a longitudinal cross-sectional view of another flexible shaft coupling embodying the first invention.
Figure 4:
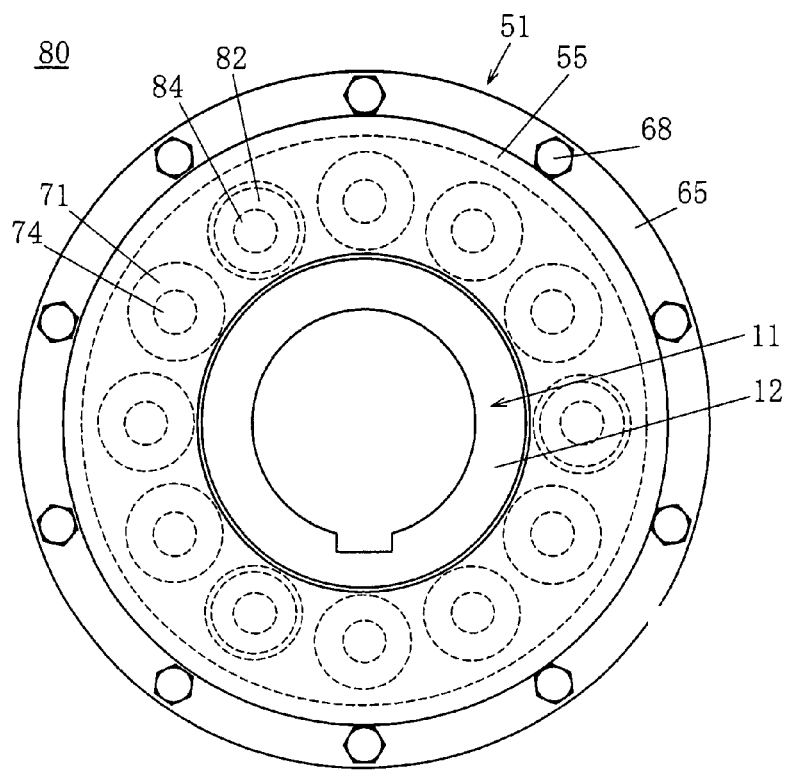
FIG. 4 is a front view of the flexible shaft coupling shown in FIG. 3.

FIGS. 3 and 4 show another flexible shaft coupling 80 embodying the first invention. FIG. 3 is a cross-sectional view of the flexible shaft coupling and FIG. 4 is a front view of the same flexible shaft coupling. Parts and members of the following embodiments similar to those of the first embodiment are designated by similar reference characters, without duplicating description thereof.

A flexible shaft coupling 80 comprises a first hub 11, a second hub 31, a cover 51, a plurality of coil spring sets 71 and stoppers 82. The flexible shaft coupling 80 is similar to the flexible shaft coupling 10 shown in FIG. 1 except that three of the twelve coil spring sets 71 are replaced with stoppers 82.

The stopper 82 comprises a barrel-shaped stopper body 83 and a shaft portion 84 protruding from both ends of the stopper body 83. Three stoppers 82 are disposed along the periphery at intervals of 120 degrees and between adjoining coil spring sets 71. The shaft portion 84 of the stopper 82 fits in the spring supporting holes 39 and 61 in the flange 38 on the second hub 31 and the cover 51. Both ends of the stopper 82 are supported by the second hub 31 and the cover 51. The space clearance d between the largest diameter portion 86 in the middle of the stoppers 82 and the inner surface 20 of the spring holes 19 is configured so that the largest diameter portion 86 of the stopper 82 comes into contact with the inner surface 20 of the spring hole 19 when the barrel-shaped coil spring 71a and 71b receive a load exceeding the allowable load therefor. The allowable load is determined based on, for example, the fatigue limit of the barrel-shaped coil spring 71a and 71b. The appropriate number of the stoppers 82 is ½ to ⅙ of the number of the coil spring sets 71. Though the coil spring sets 71 and stoppers 82 are disposed on the same pitch circumference, they may also be on different pitch circumferences. The coil spring sets 71 and stoppers 82 are preferably disposed with rotational symmetry about the axis of the coupling.

When the load on the barrel-shaped coil springs 71a and 71b reaches the allowable load, the largest diameter portion of the stoppers 82 comes into contact with the inner surface 20 of the spring holes 19. The torque is then transmitted through the barrel-shaped coil springs and stoppers 82. If the load on the barrel-shaped coil springs 71a and 71b exceeds the allowable load, the barrel-shaped coil springs and stoppers 82 bear the load. Therefore, the load on the barrel-shaped coil springs 71a and 71b does not exceed the allowable load, and thus the barrel-shaped coil springs are protected from breakage.

Figure 5:
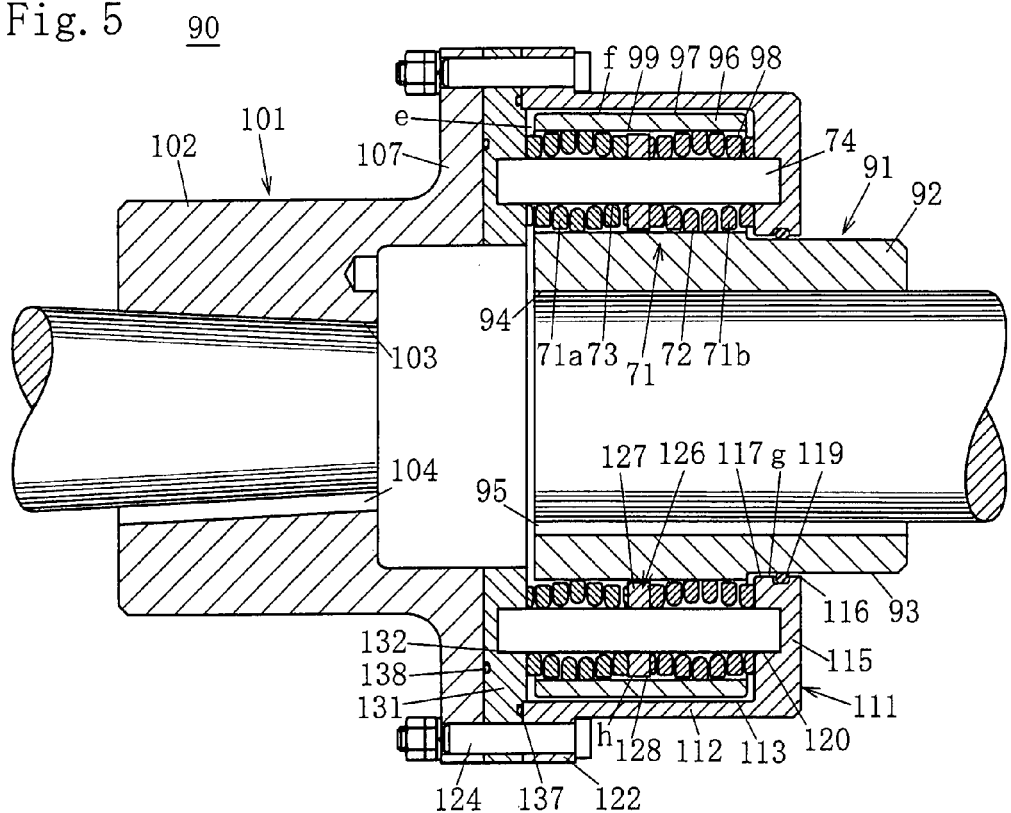
FIG. 5 is a longitudinal cross-sectional view of a flexible shaft coupling embodying the second invention.
Figure 6:
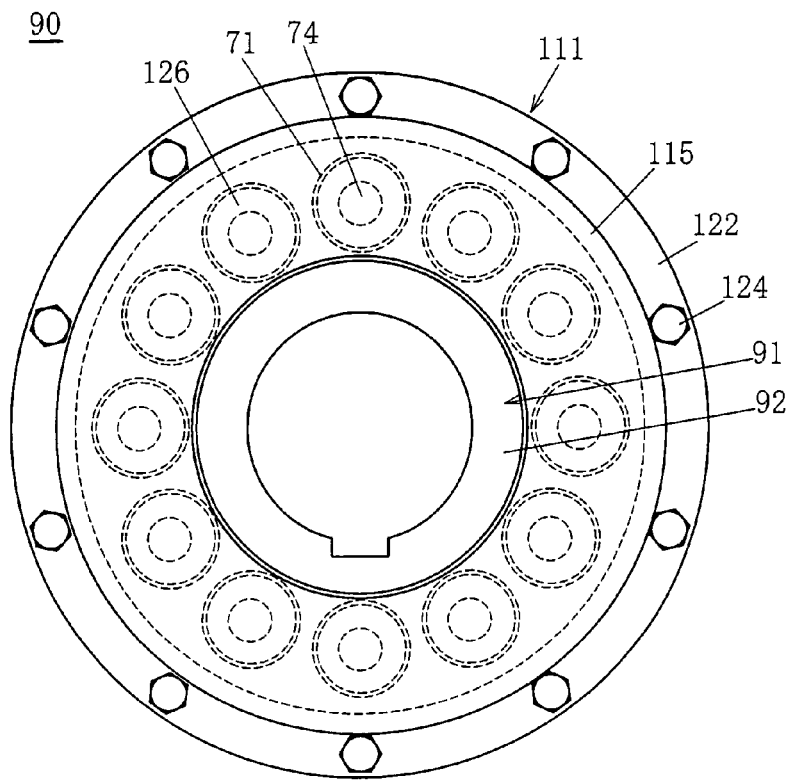
FIG. 6 is a front view of the flexible shaft coupling shown in FIG. 5.

Now a preferred embodiment of the second invention will be described. FIG. 5 is a cross-sectional view of a flexible shaft coupling and FIG. 6 is a front view of the same flexible shaft coupling.

A flexible shaft coupling 90 comprises a first hub 91, a second hub 101, a cover 111, a center flange 131, a plurality of coil spring sets 71 and stoppers 126.

The first hub 91, cover 111 and coil spring sets 71 are of the same structure as those shown in FIG. 1. The second hub 101 differs from the second hub 31 shown in FIG. 1 in that no spring supporting pin holes are provided.

The center flange 131 is annular and has spring supporting pin holes 132 that are provided in one end face thereof so as to correspond to the spring holes 98 in the flange 97 on the first hub 91.

The flanges 107 and 122 on the second hub 101 and cover 111 are connected via the center flange 131 by means of connecting bolts 124. When the second hub 101 and cover 111 are connected, both ends of the spring supporting pins 74 fit in the spring supporting pin holes 120 and 132 in the cover 111 and center flange 131. Both ends of the spring supporting pins 74 are thus supported by the cover 111 and center flange 131. The flange 97 on the first hub 91 is accommodated in the cylindrical cover body 112 of the cover 111 in such a manner as to face the center flange 131. Space clearances e, f and g large enough for accommodation of shaft misalignments are provided between the flange 96 on the first hub 91 and the center flange 131, the outer periphery 97 of the flange 96 on the first hub 91 and the inner periphery 113 of the cover body 112 of the cover 111, and the outer periphery 93 of the cylindrical part 92 of the first hub 91 and the inner periphery of the annular portion 115 of the cover 111.

O rings 119, 137 and 138 are inserted to prevent the infiltration of water and dust from outside into the cover 111 between the outer periphery 93 of the cylindrical part 92 of the first hub 91 and the inner periphery 117 of the annular portion 115 of the cover 111, the cover 111 and center flange 131, and the flange 107 of the second hub 101 and the center flange 131. Greasing the inside will enhance lubrication and rust prevention.

The stopper 126 described below is inserted between the first and second barrel-shaped coil springs 71a and 71b, with the end face of the coil springs facing the surface of the stopper. Each coil spring set 71 is passed through the spring hole 98 in the flange 96 of the first hub 91. The largest outside diameter portion 72 of each barrel-shaped coil spring 71a and 71b is loose-fitted in the spring hole 98 in the first hub 91 and the smallest inside diameter portion 73 thereof is interference-fitted over the spring supporting pin 74. The barrel-shaped coil springs 71a and 71b are interposed, in a compressed state, between the cover 111 and center flange 131 so that, when torque is transmitted, the barrel-shaped coil springs deform and come into contact with adjoining coils thereof.

The stopper 126 comprises an annular steel disk 127 and is inserted between the adjoining barrel-shaped coil springs 71a and 71b in each set of the coil spring sets 71. The inner side of the stopper 126 is interference-fitted over the spring supporting pin 74. The space clearance h between the outer periphery of the stopper 126 and the inner periphery 99 of the spring hole 98 is configured so that the outer periphery 128 of the stopper 126 comes into contact with the inner periphery 99 of the spring hole 98 when the barrel-shaped coil springs 71a and 71b receive a load exceeding the allowable load therefor.

The flexible shaft coupling 90 described above works similarly to the first embodiment of this invention. This flexible shaft coupling can be disassembled by removing the first hub 91, cover 111 and center flange 131 in one piece from the second hub 101. As this eliminates the need for pulling out the spring supporting pin 74, the flexible shaft coupling is suited for use in areas where disassembly space is limited.

Figure 7:
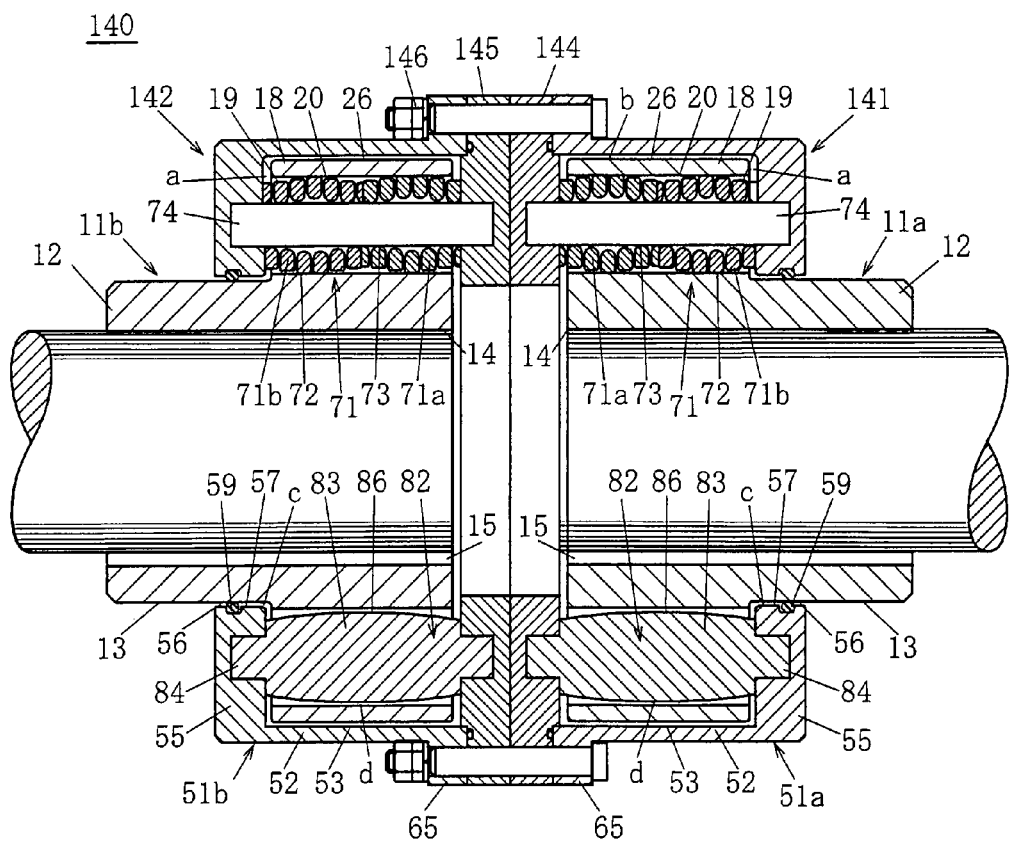
FIG. 7 is a longitudinal cross-sectional view of a flexible shaft coupling embodying the third invention.

FIG. 7 shows a preferred embodiment of the third invention. FIG. 7 is a cross-sectional view of a flexible shaft coupling.

A flexible shaft coupling 140 consists of a first coupling unit 141 and a second coupling unit 142. Each of the first and second coupling units comprises a hub, cover, center flange, a plurality of coil spring sets and stoppers. The hub, cover, coil spring sets and stoppers are the same as those shown in FIGS. 3 and 4.

The first coupling unit hub 11a has a cylindrical part 12 provided a flange 18 at one end thereof and adapted for connection of the transmission shaft. The first coupling unit cover 51a holds the cylindrical part 12 of the first coupling unit hub 11a passed therethrough and accommodates the flange 18 of the first coupling unit hub 11a. The first center flange 144 is annular and has spring supporting pin holes. The barrel-shaped coil springs 71a and 71b are passed through the multiple spring holes 19 provided along the periphery of the flange 18 of the first coupling unit hub 11a and supported by the spring support pins 74 supported by the first coupling unit cover 51a and the first center flange 144. In each spring hole 19, barrel-shaped coil springs 71a and 71b are disposed so that the adjoining end faces thereof are in contact and in series with each other. The largest outside diameter portion of each barrel-shaped coil spring is loose-fitted in the spring hole 19 in the first coupling unit hub 11a and the smallest inside diameter portion thereof is interference-fitted over the spring supporting pin 74. The barrel-shaped springs 71a and 71b are compressed between the first coupling unit cover 51a and the first center flange 144 so that, when torque is transmitted, the barrel-shaped coil springs deform and come into contact with adjoining coils thereof. The stopper 82 is barrel-shaped and both ends of the shaft portion 84 thereof are supported by the first coupling unit cover 51a and the first center flange 144.

The second coupling unit 142 comprises, as with the first coupling unit 141, a second coupling unit hub 11b, a second coupling unit cover 51b, a second center flange 145, a plurality of coil spring sets 71 and stoppers 82 and is configured like the first coupling unit 141. The first and second coupling units 141 and 142 are connected by connecting bolts 146 with the first and second center flanges 144 and 145 interposed therebetween.

The flexible shaft coupling 140 transmits torque and accommodates shaft misalignments in the same way as the flexible shaft couplings shown in FIG. 1, 3 or 5 do. While the amount of torque the flexible shaft coupling 140 transmits is the same as that transmitted by the flexible shaft couplings shown in FIG. 1, 3 or 5, the amount of the offset misalignment, axial misalignment and angular misalignment the flexible shaft coupling 140 adjusts is double that adjusted by the flexible shaft couplings shown in FIG. 1, 3 or 5. As the torsional spring constant is ½, the flexible shaft coupling 140 has greater shock absorbing and vibration damping performance.

The present invention is by no means limited to the preferred embodiments described above. For example, a coil spring set may be made of three or more barrel-shaped coil springs, instead of two. While the stopper body and the shaft portion thereof in the flexible shaft coupling shown in FIGS. 3 and 7 are in one piece, the stopper may comprises a hollow barrel-shaped stopper body passed through by a pin. The stopper may also be annular in shape. The numbers of sets of barrel-shaped coil springs and stoppers are also by no means limited to those in the preferred embodiments described above.

What is claimed is:

1. A flexible shaft coupling, comprising:
a first hub for connection to a transmission shaft, said first hub having a cylindrical part, an outwardly extending flange at one end of said cylindrical part and a plurality of spring holes each extending in the direction of a coupling axis with the transmission shaft, said spring holes extending through said flange and being circumferentially spaced along the periphery thereof;
a second hub for connection to another transmission shaft, said second hub having a cylindrical part and an outwardly extending flange at one end of said cylindrical part;
a cover fixed to said flange of said second hub so that said flange of said first hub is accommodated therein, said cylindrical part of said first hub extending into said cover, and said flange of said first hub and each of said flange of said second hub and said cover having a space there between sufficient to accommodate shaft misalignments;
spring supporting pins extending in the direction of the coupling axis and supported between said flange of said second hub and said cover; and
a plurality of coil spring sets each comprising multiple barrel-shaped coil springs,
each of said barrel-shaped coil springs having a center diameter which is larger than a diameter of either of its ends,
each of said barrel-shaped coil springs being located in one of said spring holes and supported in the one of said spring holes by a corresponding one of said spring supporting pins so that said barrel-shaped coil springs in each of said coil spring sets have adjoining end faces in contact with or able to exert a force on one another, and in series with each other,
a largest-diameter portion of each of said barrel-shaped coil springs being clearance fitted in the one of said spring holes and a smallest-diameter portion of each of said barrel-shaped coil springs being interference fitted over the corresponding one of said spring supporting pins, and said barrel-shaped coil springs being compressed between said cover and said flange of said second hub so that when torque is transmitted between said first hub and said second hub via said barrel-shaped coil springs, said barrel-shaped coil springs deform and adjoining coils of said coil springs come into contact with each other, with friction resulting from the contact causing said coil springs to absorb shocks and reduce torsional vibration.

2. The flexible shaft coupling according to claim 1, wherein the largest-diameter portion of each of said barrel-shaped coil springs is clearance fitted in the one of said spring holes with a clearance of 0.1% to 15% of the largest outside diameter the coil spring.

3. The flexible shaft coupling according to claim 1, further comprising a barrel-shaped stopper in another of said spring holes, said barrel-shaped stopper being supported by said flange of said second hub and said cover.

4. A flexible shaft coupling, comprising:

a first hub for connection to a transmission shaft, said first hub having a cylindrical part, an outwardly extending flange at one end of said cylindrical part and a plurality of spring holes each extending in the direction of a coupling axis with the transmission shaft, said spring holes extending through said flange and being circumferentially spaced along the periphery thereof;

a second flange;

a cover fixed to said second flange so that said flange of said first hub is accommodated therein, said cylindrical part of said first hub extending into said cover, and said flange of said first hub and each of said second flange and said cover having a space there between sufficient to accommodate shaft misalignments;

spring supporting pins extending in the direction of the coupling axis and supported between said second flange and said cover; and a plurality of coil spring sets each comprising multiple barrel-shaped coil springs, each of said barrel-shaped coil springs having a center diameter which is larger than a diameter of either of its ends, each of said coil spring sets being located in one of said spring holes, said barrel-shaped coil springs thereof supported in the one of said spring holes by a corresponding one of said spring supporting pins so that said barrel-shaped coil springs in each of said coil spring sets have adjoining end faces that are in contact with or able to exert a force on one another, and are in series with each other, a largest-diameter portion of each of said barrel-shaped coil springs being clearance fitted in the one of said spring holes and a smallest-diameter portion of each of said barrel-shaped coil springs being interference fitted over the corresponding one of said spring supporting pins, and said barrel-shaped coil springs being compressed between said cover and said second flange so that when torque is transmitted between said first hub and said second flange via said barrel-shaped coil springs, said barrel-shaped coil springs deform and adjoining coils of said coil springs come into contact with each other, with friction resulting from the contact causing said coil springs to absorb shocks and reduce torsional vibration.

5. The flexible shaft coupling according to claim 4, wherein the largest-diameter portion of each of said barrel-shaped coil springs is clearance fitted in the one of said spring holes with a clearance of 0.1% to 15% of the largest outside diameter the coil spring.

6. The flexible shaft coupling according to claim 4, further comprising a barrel-shaped stopper in another of said spring holes, said barrel-shaped stopper being supported by said second flange and said cover.

7. The flexible shaft coupling according to claim 4, further comprising an annular stopper inserted between adjoining said barrel-shaped springs of said coil spring sets.

8. The flexible shaft coupling of claim 4, further comprising a second hub for connection to a transmission shaft, said second hub having a cylindrical part and an outwardly extending flange at one end of said cylindrical part, wherein:

said cover includes an outwardly extending flange at one end thereof, said second flange is an annular center flange held between said flange of said cover and said flange of said second hub.

9. The flexible shaft coupling according to claim 8, wherein the largest-diameter portion of each of said barrel-shaped coil springs is clearance fitted in the one of said spring holes with a clearance of 0.1% to 15% of the largest outside diameter the coil spring.

10. The flexible shaft coupling according to claim 8, further comprising a barrel-shaped stopper in another of said spring holes, said barrel-shaped stopper being supported by said second flange and said cover.

11. The flexible shaft coupling according to claim 8, further comprising an annular stopper inserted between adjoining said barrel-shaped springs of said coil spring sets.

12. The flexible shaft coupling of claim 4, further comprising:

a second hub for connection to another transmission shaft, said second hub having a cylindrical part, an outwardly extending flange at one end of said cylindrical part and a plurality of spring holes each extending in the direction of the coupling axis, said spring holes extending through said flange and being circumferentially spaced along the periphery thereof;

a second cover having a flange at one end thereof, said cylindrical part of said second hub extending into said second cover;

an annular center flange in contact with an end face of said second cover so that said outwardly extending flange of said second hub is accommodated in said second cover, and said flange of said second hub and each of said annular center flange and said second cover having a space there between sufficient to accommodate shaft misalignments;

second spring supporting pins extending in the direction of the coupling axis and supported between said annular center flange and said second cover; and a plurality of second coil spring sets each comprising multiple barrel-shaped coil springs, each of said barrel-shaped coil springs of said second coil spring sets having a center diameter which is larger than a diameter of either of its ends, each of said second coil spring sets being located in one of said second spring holes, said barrel-shaped coil springs thereof being supported in the one of said second spring holes by a corresponding one of said second spring supporting pins so that said barrel-shaped coil springs in each of said second coil spring sets have adjoining end faces that are in contact with or able to exert a force on one another, and are in series with each other, a largest-diameter portion of each of said barrel-shaped coil springs being clearance fitted in the one of said second spring holes and a smallest-diameter portion of each of said barrel-shaped coil springs being interference fitted over the corresponding one of said second spring supporting pins, and said barrel-shaped coil springs being compressed between said second cover and said annular center flange so that when torque is transmitted between said second hub and said second flange via said barrel-shaped coil springs, said barrel-shaped coil springs deform and adjoining coils of said coil springs come into contact with each other, with friction resulting from the contact causing said coil springs to absorb shocks and reduce torsional vibration;

wherein said annular center flange is fixed with respect to said second flange, said annular center flange and said second flange facing each other.

13. The flexible shaft coupling according to claim 12, wherein the largest-diameter portion of each of said barrel-shaped coil springs is clearance fitted in the one of said spring holes with a clearance of 0.1% to 15% of the largest outside diameter the coil spring.

14. The flexible shaft coupling according to claim 12, further comprising a barrel-shaped stopper in another of said spring holes, said barrel-shaped stopper being supported by said second flange and said cover.

15. The flexible shaft coupling according to claim 14, further comprising a barrel-shaped stopper in another of said second spring holes, said barrel-shaped stopper being supported by said annular center flange and said second cover.

16. The flexible shaft coupling according to claim 12, further comprising an annular stopper inserted between adjoining said barrel-shaped springs of each of said coil spring sets.

17. The flexible shaft coupling of claim 4, wherein said adjoining end faces of said barrel-shaped coil springs are in direct contact with each other.

* * * * *